United States Patent [19]

Desfontaines et al.

[11] Patent Number: 4,842,813
[45] Date of Patent: Jun. 27, 1989

[54] NUCLEAR REACTOR HAVING A LONGITUDINALLY ELONGATED VESSEL

[75] Inventors: Guy Desfontaines, Puteaux; Jean P. Millot, Elancourt, both of France

[73] Assignee: Framatome, Courbevoie, France

[21] Appl. No.: 23,351

[22] Filed: Mar. 9, 1987

[30] Foreign Application Priority Data

Mar. 7, 1986 [FR] France .............................. 86 03253

[51] Int. Cl.⁴ ........................ G21C 15/00; G21C 15/18
[52] U.S. Cl. .................................. 376/353; 376/245; 376/399; 376/400; 376/282; 376/243
[58] Field of Search ............... 376/353, 282, 243, 399, 376/400

[56] References Cited

U.S. PATENT DOCUMENTS

| | | |
|---|---|---|
| 3,849,257 | 11/1974 | Bevilacqua . |
| 3,920,514 | 11/1975 | Calvin . |
| 3,976,834 | 8/1976 | Bevilacqua . |
| 4,092,216 | 5/1978 | Aubert . |
| 4,164,443 | 8/1979 | Gibbons et al. . |
| 4,457,889 | 7/1984 | Vienne ................................ 376/282 |
| 4,562,038 | 12/1985 | Assedo et al. ....................... 376/353 |
| 4,585,613 | 4/1986 | Styskal et al. ....................... 376/260 |
| 4,659,539 | 4/1987 | Kimbrell et al. .................... 376/399 |
| 4,687,628 | 8/1987 | Gillet et al. ......................... 376/353 |
| 4,707,331 | 11/1987 | Sherwood et al. ................. 376/353 |
| 4,716,013 | 12/1987 | Veronesi et al. ................... 376/353 |

FOREIGN PATENT DOCUMENTS

0218991 12/1984 Japan .................................. 326/353
0218094 10/1985 Japan .................................. 326/353

*Primary Examiner*—Harvey E. Behrend
*Attorney, Agent, or Firm*—Pollock, Vande Sande & Priddy

[57] ABSTRACT

Nuclear reactor having upper internal equipments and lower internal equipments with probe guiding means including probe guide ducts for slidably guiding flexible elongated probes into the core. The upper internal equipments include a plenum chamber for collecting the coolant coming out of the core and separating means disposed between the core and the plenum chamber, said separating means including two plates, one upper and one lower, connected at their periphery by an envelope and comprising spacer tubes through which pass the coolant so as to avoid passing through cluster guides for guiding the clusters of control elements into and out of the core. Lower internal equipments placed between the core and the bottom of the vessel include an enclosure and ducts for the passage of the coolant entering the core, said enclosure thus defining a tranquilized volume in which the probe guide ducts are distributed. These probe ducts penetrate into the reactor through sleeves situated above coolant inlet and outlet nozzles means.

9 Claims, 5 Drawing Sheets

NUCLEAR REACTOR HAVING A LONGITUDINALLY ELONGATED VESSEL

FIELD OF THE INVENTION

The present invention relates to nuclear reactors and their internal equipments, and more particularly to pressurized water nuclear reactors, called PWR.

However the invention may concern any type of reactors comprising a pressure resistant vessel for containment of a pressurized coolant, a removable cover for said vessel, coolant inlet nozzle means provided through said vessel and coolant outlet nozzle means provided through said vessel located in proximity of the cover, a core located within the vessel, arranged to be upwardly traversed by the coolant in operation and comprising a plurality of mutually adjacent fuel assemblies, a plurality of clusters of control elements vertically movable by drive shafts projecting through the cover of the reactor for moving the control elements into and out of said core, and internal equipments including upper internal equipments located between the core and the cover.

The invention also relates to reactors having internal equipments comprising lower internal equipments located between the core and the bottom of the vessel and having probe guiding means for guiding elongated probes into and out of the core and penetrating into the core through the lower part of the assemblies.

STATE OF THE ART

Different types of nuclear reactors with their respective internal equipments are already known.

European Pat. No. 0,125,326, relating to upper internal equipments for pressurized water reactors, discloses an architecture having the coolant entering the reactor through one or more coolant inlet nozzles, flowing along the inner surface of the vessel for penetrating into the core through the bottom part of the core of the reactor, traversing said core therefore removing some of its heat, and then coming out of said core for penetrating into a chamber including guide tubes for clusters of control elements before entering a coolant distribution calender which deflects the coolant towards coolant outlet nozzles.

The guide tubes are for guiding clusters and their drive rods or drive shafts. The coolant leaving the core is flowing through the guide tubes of the clusters or clusters guides.

This solution has different drawbacks. The cluster guides being traversed by the coolant, are subjected to shocks and turbulences due to said coolant passage. This for example, may damage the drive rods of the clusters of control elements. Moreover, if the primary coolant system is accidentially damaged in its cold part before entering the vessel, the volume of water situated above the core in the upper internal equipments will poorly contribute to the emergency cooling of the core because said volume of water, on one hand will be at a high temperature (the core outlet temperature) and on the other hand will tend to disappear shortly through the breach.

Concerning lower internal equipments of nuclear reactors of the prior art, they typically include in the low part of the vessel, a structure formed of guide tubes for guiding elongated probes into an out of the assemblies from underneath the core. The guide tubes for elongated probes sealingly project into the reactor vessel from underneath through the vessel bottom and are disposed in the prolongation of the guide tubes. This forms weak points, which in case of several breaks are likely to cause emptying of the vessel and dewatering of the core.

Another solution consists in connecting the core monitoring instrumentation through the cover of the vessel. This requires disconnecting said instrumentation whenever it is necessary to remove the vessel cover. However, it might seem to a man skilled in the art that the internal equipments such as defined above were sufficient.

SUMMARY OF THE INVENTION

It is an object of the present invention to provide an improved reactor; it is a more particular object to provide a reactor the internal equipments of which provide:

a better protection for the cluster guides for guiding the clusters of control elements and their drive shafts, by avoiding to have coolant gone out of the core traverse said cluster guides, an improved safety in case of a primary coolant system breaking on the cold part of the circuit located upstream of the coolant inlet nozzle, by creating a substantial water reserve formed by the volume situated above the core and through which the coolant does not pass, the emptying time of which volume may be controlled, its temperature being close to the coolant inlet temperature into the vessel.

It is therefore possible to omit the safety injection accumulators external to the vessel which are used in prior art in case of such breaking accident.

the use of the differential pressure existing between the sky of the vessel and the chamber including the cluster guiding means due to the hydraulic pressure and to the head losses; this creates a flow directed downwardly which forms an aid to clusters falling and may also be used for cooling fertile control elements, a minimization of the number of penetrations of mechanisms driving the drive shafts of the clusters of control elements through the vessel cover.

To this end, the invention provides a nuclear reactor comprising:

(a) a pressure resistant vessel for containment of a pressurized coolant, (b) a removable cover for said vessel, (c) coolant outlet nozzle means provided through said vessel in close proximity of said cover, (e) a core located in said vessel arranged to be upwardly traversed by said coolant in operation and having a plurality of mutually adjacent fuel assemblies, (f) a plurality of clusters of control elements, each vertically movable into and out of said core by a drive shaft, (g) upper internal equipments located in said vessel between said core and said cover having:

separating means directly located above said core for collecting the coolant flowing out of said core and comprising a lower perforated plate and an upper perforated plate, each having a plurality of holes for passage of said coolant through said plates, each of said holes in said lower plates being connected to a respective one of said holes in said upper plate by a spacer tube for guidance of the coolant within and along said spacer tube through said separating means, said separating means further comprising a plurality of cluster guides each one located along said spacer tubes for guiding a respective one of said clusters and their corresponding drive shaft through said separating means, and an external envelope connected to said upper and said lower plates, a plenum chamber for collecting the coolant flowing out of said spacer tubes through the holes in said upper plate and directing said coolant toward the coolant outlet nozzle means, and a plurality of guiding tubes in said plenum chamber aligned with said spacer tubes for guiding the drive shafts of said clusters through said plenum chamber.

Above described internal equipments are particularly advantageous in reactors having a large number of clusters such as spectrum variation reactors called RVS and/or undermoderated reactors called RSM which use clusters of regular control elements and clusters of elements for varying the neutron energy spectrum.

The invention also provides a nuclear reactor comprising:

(a) a pressure resistant vessel for containment of a pressurized coolant,
(b) a removable cover for said vessel,
(c) coolant inlet nozzle means provided through said vessel and coolant outlet nozzle means provided through said vessel in close proximity of said cover,
(d) a core located in said vessel arranged to be upwardly traversed by said coolant in operation, having a plurality of mutually adjacent fuel assemblies and supported by a perforated supporting plate having a plurality of passage holes for passage of said coolant into the core,
(e) upper internal equipments located above said core,
(f) a cylindrical external barrel located within said vessel and spaced from the inner surface of said vessel, said barrel containing the core and the upper internal equipments, and
(g) probe guiding means for slidably guiding flexible elongated probes into and out of said core through the lower part of the assembly, comprising:
   at least one sleeve sealingly projecting through and fixed to said vessel above the coolant inlet and outlet nozzle means, and
   probe guide ducts each arranged for receiving at least one elongated probe, said guide ducts following a path penetrating into the vessels through said sleeve, projecting downwardly along and fixed to said cylindrical barrel, extending below the lower supporting plate of the core toward which said probe guide ducts are transversely distributed and directed for traversing said supporting plate and terminating in close proximity of the lower part of the assemblies.

This arrangement permits to suppress penetrations occuring below the coolant inlet and outlet nozzles, for example in the vessel bottom, and this in addition to the results already mentioned.

The invention also provide some preferred embodiments as follows:

a nuclear reactor further comprising a cylindrical external barrel located within the vessel and spaced from an inner surface of said vessel, said barrel containing the core, the separating device and the plenum chamber, and being arranged to direct a major part of the coolant introduced into the vessel through coolant inlet nozzle means into a space under the core, wherein the upper internal equipments further comprise means for driving some of said coolant, introduced through said inlet nozzle means, above the plenum chamber and said guiding tubes for downwardly supplying a flow of coolant through said guiding tubes into the separating means.

The guiding means for the clusters or "cluster guides" are units formed as mechanically welded parts. They include transverse perforated plates or "guide cards" connected together by continuous guide sleeves and by square bars extending over the whole height of the cluster guide. Some guide cards further have a lateral radial abutment against the spacer tubes so as to provide good transverse rigidity for the guiding means and more generally the separating means.

the spacer tubes are vertical and distributed at nodal points of a hexagonal network therefore defining vertical spaces having a substantially hexagonal cross-section between each group of six adjacent ones of said spacer tubes, and wherein each of said vertical spaces contains one of said cluster guides and has a axis coinciding with the axis of said cluster guide, the transversal perforated plates thereof being held in radial abutment against each of the six spacer tubes defining said space.

the separating means form the lower part of the upper internal equipment suspended or maintained in the vessel by static clamping between the cover and the vessel.

the reactor whose fuel assemblies each comprises an upper end piece; the lower plate of the separating means comprises passages for individual control elements of said clusters into and out of the core; and said passages comprise first connecting means for slidably connecting the lower plate to a respective end piece of a fuel assembly and second connecting means for connecting the corresponding cluster guide to said lower plate.

the nuclear reactor further comprises water coolant injection means including at least one pipe whose outlet is located in proximity of the lower part of the separating means.

the guide tubes are curved with radii of curvature having a sufficient value for allowing an elongated probe to be slidably engaged and withdrawn from outside the reactor into and out of said guide ducts.

the internal equipments further comprise lower internal equipments having a bottom wall forming with the lower supporting plate of the core a remote and low disturbed enclosure for the coolant, said bottom wall and said lower supporting plate having a plurality of holes for passage of the coolant through said enclosure into the core, each of said holes in said wall being respectively connected to a respective one of said holes in said lower supporting plate by a duct for driving the coolant within and along said duct into the core assemblies, said enclosure containing the terminating parts of the probe guide ducts which are extending below the lower supporting plate.

SHORT DESCRIPTION OF THE DRAWINGS

The invention will be better understood from reading the following description of particular embodiments given by way of non limitative example. The description refers to the accompanying drawings in which.

DETAILED DESCRIPTION OF PREFERRED EMBODIMENTS

Figure 1:
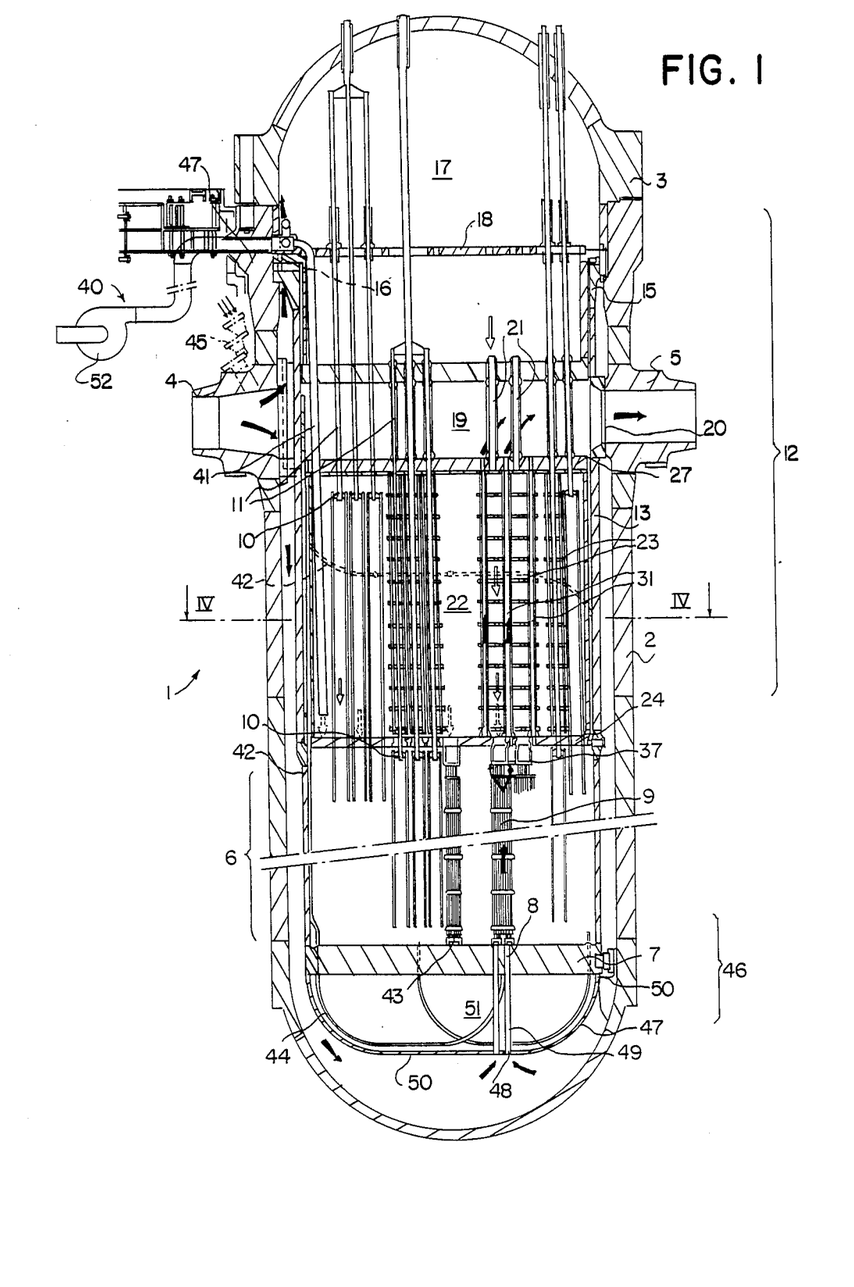
FIG. 1 is a general section view of a reactor according to the invention.

Referring to FIG. 1, a pressurized water reactor 1 includes a pressure resistant vessel 2 containing a coolant closed by a removable cover 3, coolant inlet nozzles 4 and coolant outlet nozzles 5, a core 6 with a lower supporting plate 7 perforated with holes 8 for allowing coolant to pass therethrough upwardly into the fuel assemblies 9 and clusters 10 of control elements vertically movable by drive shafts 11 through the cover 3 of reactor 1.

The reactor also includes upper internal equipments 12 located between the core 6 and the cover 3. A cylindrical external barrel 13, spaced from the internal surface 14 of vessel 2 and having an upper collar 15 maintained between cover 3 and vessel 2, drives the coolant flow entering through inlet nozzle 4 and directs it along the inner surface 14 of the vessel 2 so that it penetrates into the core 6 through the low part of the assemblies 9.

Passage means 16 at the level of the collar 15 are provided for by-passing the core, a small part of the coolant. The coolant is directed to a volume 17 defined by the cover 3 of the reactor 1 and by the top part 18 of the upper internal equipments 12 of the reactor.

A plenum chamber 19 collects the coolant coming out of the core and directs it transversely towards the coolant outlet nozzle 5, out of the vessel. The coolant traverses the cylindrical barrel 13 through holes 20 disposed in line with the outlet nozzles 5. Guiding tubes 21 guide the drive shafts 11 of clusters 10 through the chamber 19 and protect said drive rods from coolant turbulences.

Figure 2:
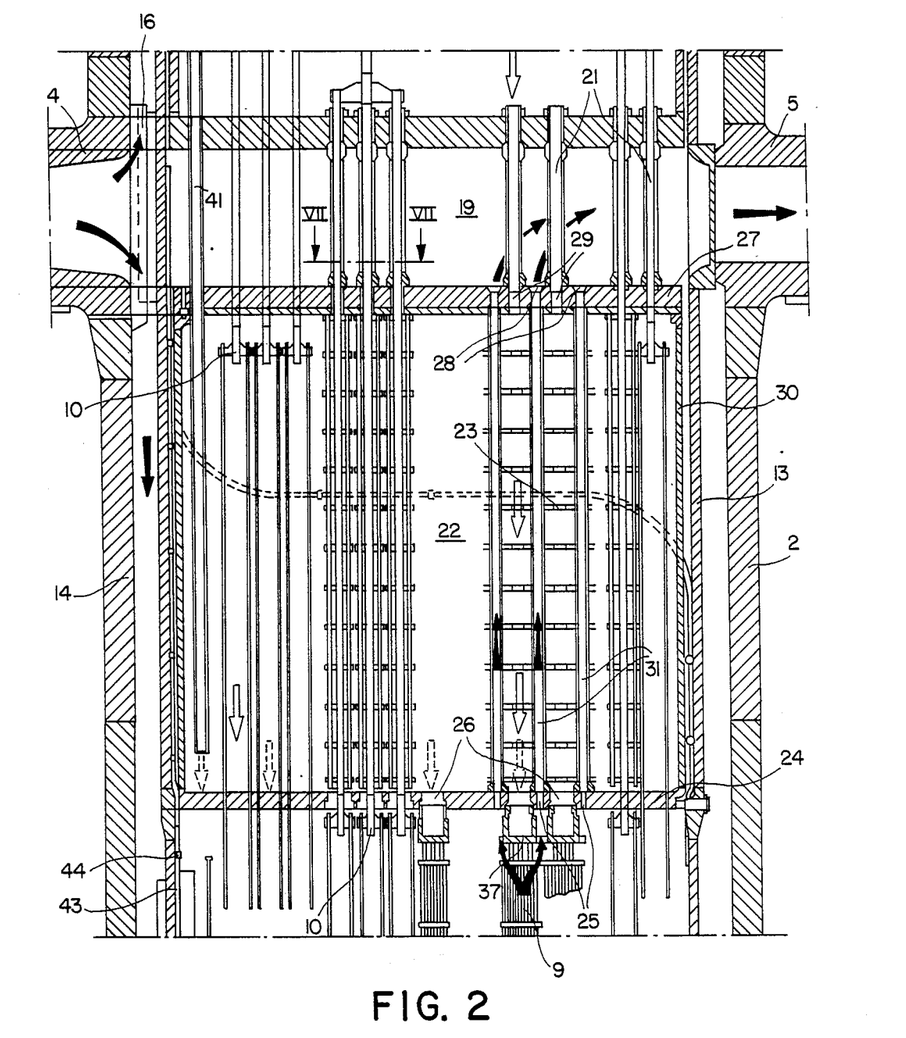
FIG. 2 is a enlarged partial view of FIG. 1 showing more precisely the upper internal equipments.

The upper internal equipments 12 further include separating means or device 22 having guides 23 for clusters 10 and for the shafts 11. The separating device is disposed between the core 6 and the plenum chamber 19.

Said device 22 further comprise a lower plate 24 perforated with holes 25 allowing the coolant to flow from the core 6 into said device 22, and with holes 26 for movement of clusters 10 and their control rods 11 through the lower plate into an out of the assemblies 9 of the core. The device 22 has an upper plate 27 perforated with holes 28 for the coolant to pass into the chamber 19 and holes 29, placed in line with the guiding tubes 21 of the drive shafts 11 of clusters of control elements.

Both plates of the device 22 are connected together at their periphery by an envelope 30 therefore forming an enclosure. The envelope constitutes the radial external limit of the separating device 22. A minimum clearance between device 22 and the cylindrical external barrel 13 is provided.

Spacer tubes 31 connect together the coolant passage holes 25 of the lower plate 24 with the coolant passage holes 28 of the upper plate 27 and are disposed between the cluster guides 23.

Figure 5:
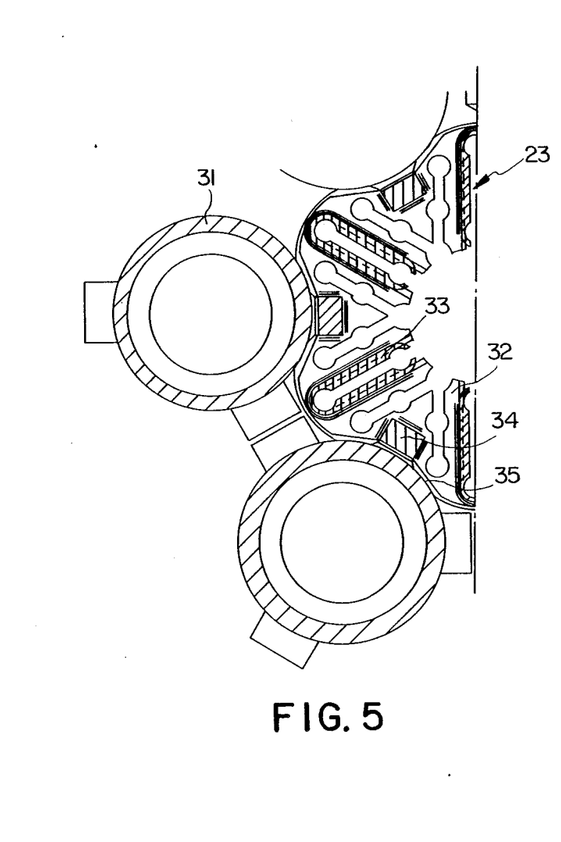
FIG. 5 is an half plan view in section of a cluster guide surrounded by spacer tubes according to the invention.

The cluster guides 23 may preferably be open mechanically welded, tubular units formed by perforated plates or "guide cards" 32 spaced apart by continuous guide sleeves 33 and square bars 34 extending over and along the whole height of the cluster guides (FIG. 5).

Figure 4:
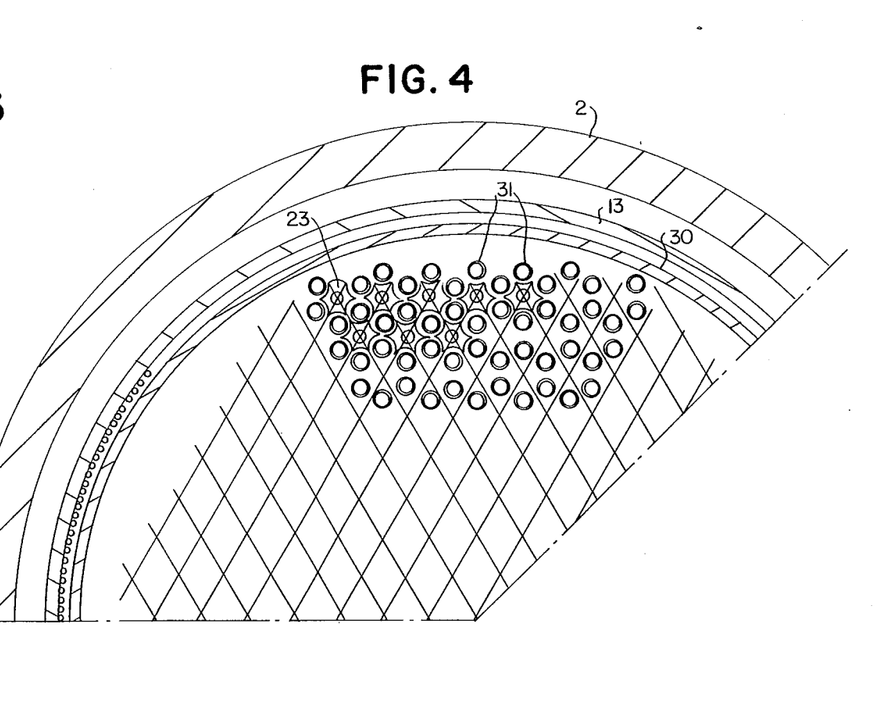
FIG. 4 is a section view through IV—IV of FIG. 1.

FIGS. 4 and 5 show a preferred embodiment with spacer tubes 31 disposed according to a triangular pitch. The spacer tubes are symetrically disposed at the six apices of a hexagon, the center of each hexagon being located on the axis of a corresponding cluster guide 23.

FIG. 5 shows more particularly in cross-section one half of a "card" 33 and three of its six associated spacer tubes 31. The cluster guide 23 is in radial abutment against each of the six surrounding tubes through bosses 35 spaced apart along the tubes; it is fixed in a way known perse to the upper plates 27 of device 22.

Figure 7:
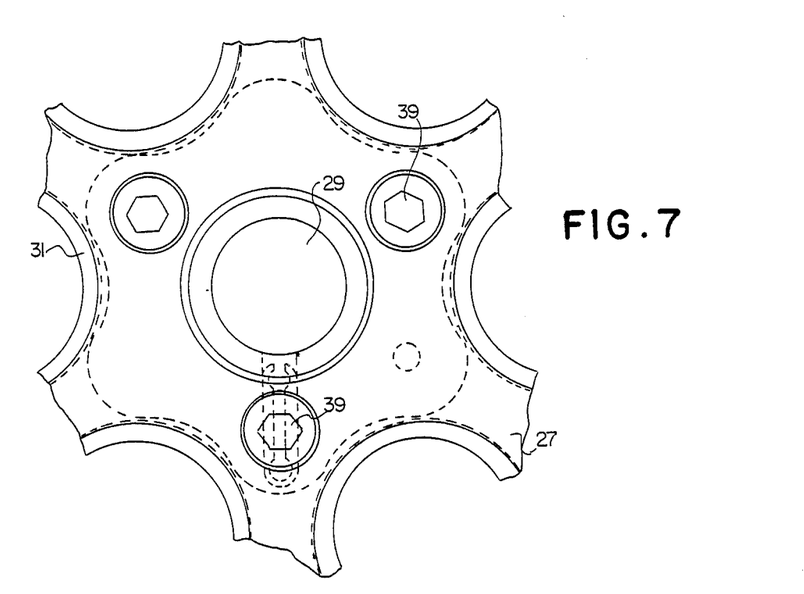
FIG. 7 is a partial plan view through VII—VII of FIG. 2.
Figure 8:
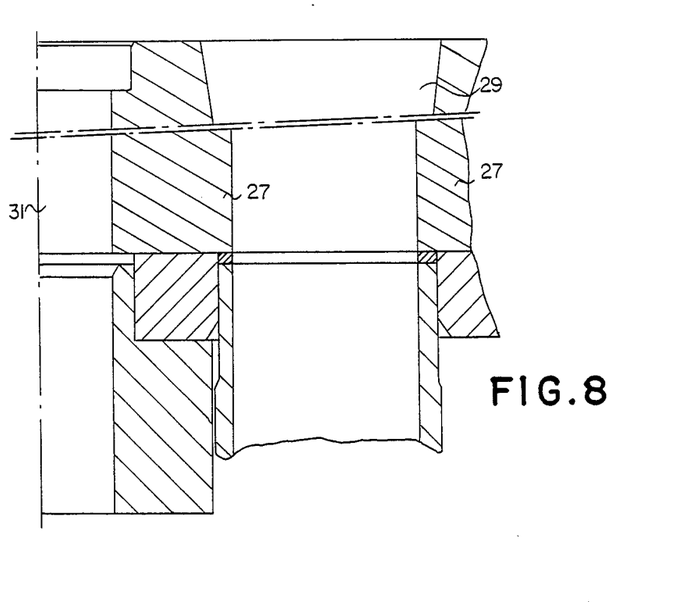
FIG. 8 is a partial enlarged view in vertical cross-section of a reactor according to FIG. 1, showing the top part of a cluster guide in the separation device.

FIG. 7 shows a partial top view of the upper plate 27.

The cluster guide 23 is shown schematically by its dotted contour. It is rigidly fixed by means of three screws 39 to plate 27. Hole 29 is for the passage of the drive rod 11 of the cluster guided by the cluster guide 23.

Figure 6:
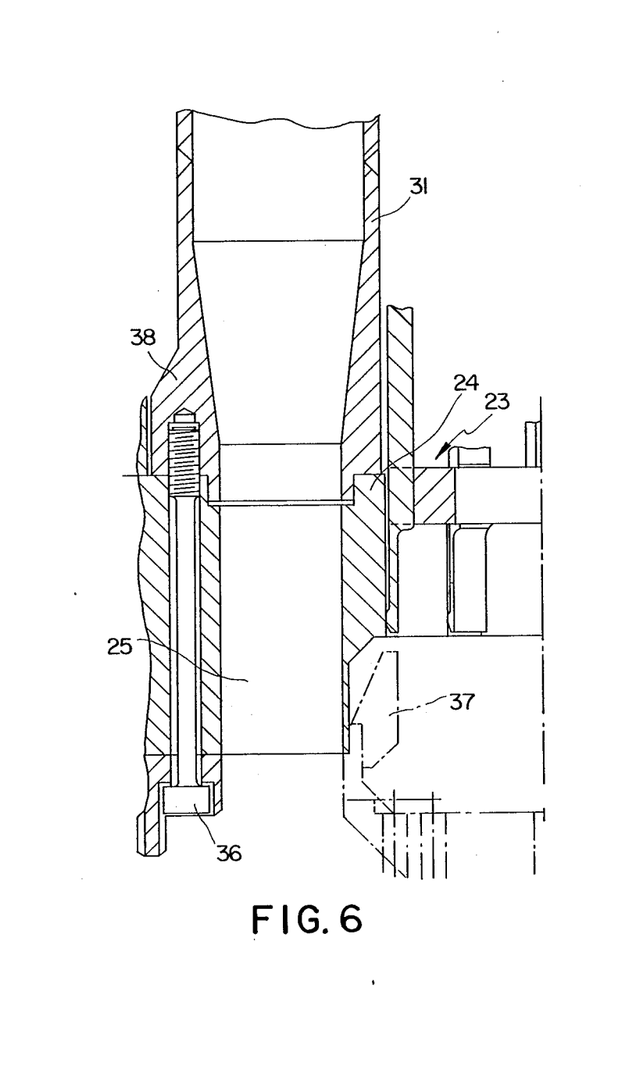
FIG. 6 is a partial enlarged view in elevation of FIG. 2 showing the low part of a cluster guide in the separation device according to the invention.

In the embodiment shown by way of non limitative example of FIG. 6, the cluster guide 23 is centered resiliently and may expand into the lower plate 24, being slidely fitted in holes 26. These holes receive from underneath the upper end pieces 37 of the corresponding fuel assemblies 9.

The spacer tubes 31 are moreover rigidly fixed thereto by screws 36 in the lower plate 24. Reinforcements 38 are finally formed in the low part of the spacer tubes 31 conveying the coolant.

In another preferred embodiment of the invention, the separating means 22 form the lower part of the upper internal equipment 12 suspended by its collar 15 supported by the vessel and pressurely maintained by the cover 3.

External cooling water may be introduced by water coolant injection means 40 directly into the separating means through at least one pipe 41 whose outlet is advantageously located in proximity of the lower part of the separating means, near the upper part of the core.

According to the invention, the internal equipments of the reactor 1 further include probe guiding means or device 42 for guiding elongated probes into and out of the core through the lower part 43 of the fuel assemblies 9. This device includes probe guide ducts 44 each intended to receive at least one elongated probe (not shown).

Figure 3:
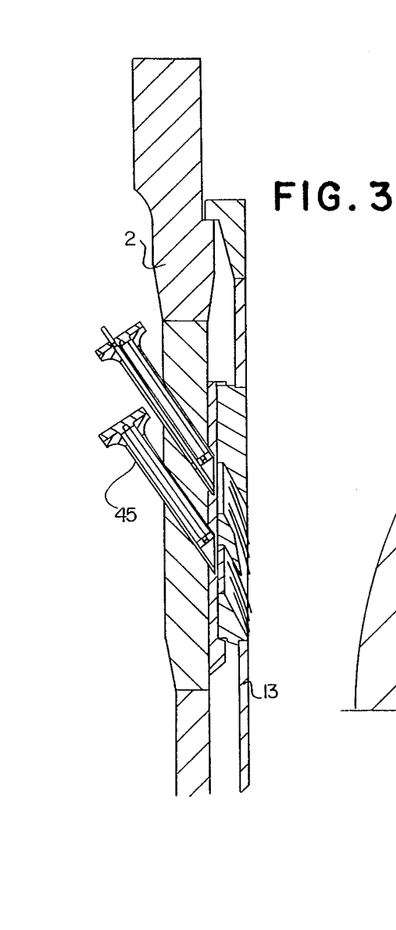
FIG. 3 is a section view showing penetrations into the vessel for guide tubes for elongated probes according to the invention.

These guide ducts 44 sealingly penetrate the vessel 2 of the reactor 1 through sleeves 45 shown with dotted lines on FIG. 1 and on FIG. 3.

These sleeves 45 are situated above the coolant inlet 4 and outlet 5 nozzles.

Ducts 44 then extend downwardly to below the lower plate of core 7 along the external barrel 13 which fixedly supports said tubes, the clearance existing between device 22 and said barrel allowing their passage. Fluid tightness of plate 24 with respect to barrel 13 is carefully provided so as to prevent the coolant coming from the assemblies from taking the path existing between the envelope 30 and barrel 13. The volume which is defined- there is relatively tranquilized. The guide ducts 44 are then transversely distributed are directed for traversing the supporting plate 7 of the core from underneath and for terminating in close proximity of the lower part of the assemblies 9.

For removing and engaging an enlongated probe from the outside of the reactor, a sufficient value for the radii of curvature is provided for the guide ducts 44.

In a preferred embodiment of the invention, the lower part of the lower internal equipments 46 includes an enclosure formed by the lower support plate 7 of the core and a wall 47 perforated with coolant passage holes 48. Ducts 49 connect said passage holes 8 in wall 47 to lower plate 8 and channel the coolant toward the core.

A volume 51 protects from turbulences is thus defined, in which the probe guide ducts 44 are distributed before terminating in close proximities of the lower part of the assemblies. The enclosure is filled through holes 50 formed for this purpose in wall 47 and air purged during the initial filling of the reactor by means provided in the support plate of the core.

Normal operation of the nuclear reactor with internal equipments such as described in the invention is described hereafter. Black arrows on FIGS. 1 and 2 indicate the path followed by the main coolant flow in the reactor.

The cold coolant enters reactor 1 through the inlet nozzles 4. The main coolant flow is deflected by external barrel 13 and for its most part downwards to the bottom of the reactor wherein it penetrates into the ducts 49 through which it flows before upwardly traversing the assemblies 9 of the core 6 of the reactor. The flow of coolant coming from each assembly is then deflected by the upper end piece 37 of said assembly towards the inlet holes 25 of the spacer tubes 31 of device 22.

The collant flow, heated by the core, then traverses device 22 through said tubes 31 and arrives in the plenum chamber 19 where it is again deflected transversely among the guide tubes 21 of drive shafts 11 toward the outlet nozzles 5 after traversing the cylindrical barrel 13 through holes 20 disposed in line with the outlet nozzles.

The coolant coming from the assemblies is therefore isolated along all its travel path, from the coolant volumes surrounding the clusters and their drive shafts contained in device 22 and in guide tubes 21. These volumes are directly connected to the capacity 17 situated under the cover of the reactor. This capacity is overpressurized with respect to the coolant leaving the assemblies. Therefore an axial downward current, shown by white arrows in FIGS. 1 and 2, is existing in tubes 21 and device 22. This downward current constitutes an aid to clusters falling which is an important safety advantage. It may also provide cooling of the clusters if some of them are for example fertile clusters as in case of spectrum variation reactors.

Passage means 16 at the level of collar 15 of the cylindrical barrel 13 are provided to direct a reduced cold coolant flow coming from the inlet nozzle, toward capacity 17 situated under the cover of the reactor. This is indicated on FIG. 1 by a thin black arrow.

During a reactor shutdown for refueling, the device for guiding the elongated probes does not need to be removed when the upper internal equipements are removed for access to the fuel assemblies.

The probe guide ducts 44 penetrates into the vessel through sleeves 45 located under the inlet and outlet coolant nozzles. Then, they are supported by the external barrel 13 down to below the core. Therefore they are independent of the upper internal equipments.

In some accidental conditions, a nuclear reactor according to the invention is particularly advantageous. One of the most penalizing situation with regard to safety is the loss of coolant due to a rupture in the primary coolant circuit. Internal equipments of a reactor according to the invention will permit the above-described flow shown with white arrows in FIGS. 1 and 2, to enter the core downwardly, even after a rupture of said primary coolant circuit just before the coolant inlet nozzle into the vessel.

Relatively cold coolant existing in the separating means and the dead volume 17 under cover 3 via the guide tubes 21 of the drive shafts 11, will directly fill the core in case of accident.

The gravitation force and the overpressure which reign at the beginning of an accident in device 22 and volume 17 direct the coolant to the core through cluster guides 23 and lower plate of device 22.

Immediately after the accident, the coolant volume having the vessel inlet temperature, and which is available in device 22 and in capacity 17 will provide cooling of the core for a time of the order of 30s, sufficient to allow the medium pressure safety injection pumps 52, MPSI, known in the prior art and forming part of the injection means 40, to start up and to reach their nominal delivery rate.

In an advantageous embodiment, but in no way limitative, the MPSI pumps 52 inject the coolant in the lower part of device 22. Two penetrations 53 pierced in the vessel flange and six pipes 41 will distribute the coolant in close proximity of the upper part of the core.

To inject coolant at the lower part of device 22 limit heat exchanges between the cold fluid delivered by the MPSI pumps and the fluid at the vessel inlet temperature or the vapor which are contained in device 22 and capacity 17, thus avoiding a pressure drop, which could result in slowing down, even preventing, the flow of safety injection fluid to reach the core for cooling said core.

The delivery rate of the MPSI pumps and the coolant passage sections through plate 24 and guiding tubes are determined to maintain a certain level of coolant in device 22, therefore authorizing an equal distribution of the coolant delivered by the MPSI pumps into all the assemblies of the core.

It is thus possible to maintain the temperature of the elements of the fuel assemblies at an acceptable level, until the core is again refilled with water at the end of the accident, by means known per se, such as low pressure safety injection pumps (LPSI).

External accumulators are no more necessary for reducing the rewatering time and can be avoided. Dimensions of the LPSI pumps may even be reduced.

We claim:
1. Nuclear reactor comprising:
   (a) a pressure resistant vessel for containment of a pressurized coolant,

(b) a removable cover for said vessel, (c) coolant outlet nozzle means provided through said vessel in close proximity of said cover, (d) a core located in said vessel arranged to be upwardly traversed by said coolant in operation and having a plurality of mutually adjacent fuel assemblies each having an upper end piece, (e) a plurality of clusters of control elements, each having an upwardly expending drive shaft and each vertically movable into and out of said core by said drive shaft, (f) upper internal equipments located in said vessel between said core and said cover, having:

separating means directly located above said core, for collecting the coolant flowing out of said core and comprising a lower plate and an upper plate, said lower plate and said upper plate each being perforated with a plurality of holes consisting of:

first holes formed in said lower plate and in said upper plate, for passage of the coolant flowing out of said core through said plates, each of said first holes in said lower plate being connected to a respective one of said first holes in said upper plate by a respective continuous fluid tight spacer tube for guiding substantially all the coolant flowing out of said core within the spacer tubes through said separating means, second holes, formed in said lower plate, for passage of the clusters through said lower plate into and out said fuel assemblies, said second holes being located above respective ones of said upper end pieces of said fuel assemblies, said upper end pieces being arranged for deflecting the coolant flowing out of said fuel assemblies away from said second holes and towards adjacent first holes in said lower plate, whereby the coolant flowing out of said core is forced to traverse the separating means through the spacer tubes, and third holes, formed in said upper plate, for passage of the drive shafts of said clusters through said upper plate, said separating means further comprising a plurality of cluster guides, each located between one of said second holes and a corresponding one of said third holes, said cluster guides being along and between the spacer tubes each for guiding a respective one of said clusters and of their drive shafts through said separating means, and said separating means comprising an external envelope unperforated on its peripheral wall and connected to said upper and said lower plates therefore forming an enclosure which constitutes radial external limits of said separating means, a plenum chamber for collecting the coolant flowing out of said spacer tubes through the first holes in said upper plate, said plenum chamber communicating radially with the outlet nozzle means, and a plurality of fluid tight guiding tubes in said plenum chamber connected to the upper plate and aligned with said cluster guides for guiding the drive shafts of said clusters across said plenum chamber, and separating said drive shafts from the coolant flowing out of the separating means and through the plenum chamber toward said outlet nozzle means.

2. Nuclear reactor according to claim 1 further comprising a cylindrical external barrel located within the vessel and spaced from an inner surface of said vessel, said barrel containing the core, the separating device and the plenum chamber, and being arranged to direct a major part of the coolant introduced into the vessel through coolant inlet nozzle means into a space under the core, wherein the upper internal equipments further comprise passage means for directing some of said coolant, introduced through said inlet nozzle means, above the plenum chamber and said guiding tubes for downwardly supplying a downward flow of coolant through said guiding tubes, whereby the pressure of the coolant in the guiding tubes and the cluster guides is higher than the pressure of the coolant flowing out of the core due to differential head losses.

3. Nuclear reactor according to claim 2, wherein the cluster guides comprise, for each cluster of control elements, guiding transversal perforated plates disposed at a plurality of levels, some of said plates being held in radial abutment against the spacer tubes of said separating means.

4. Nuclear reactor according to claim 3, wherein the spacer tubes are vertical and distributed at nodal points of a hexagonal network therefore defining vertical spaces having a substantially hexagonal cross-section between each group of six adjacent ones of said spacer tubes, and wherein each of said vertical spaces contains one of said cluster guides and has a axis coinciding with the axis of said cluster guide, the transversal perforated plates thereof being held in radial abutment against each of the six spacer tubes defining said space.

5. Nuclear reactor according to claim 1, wherein the separating means form the lower part of the upper internal equipments and wherein said upper internal equipments are maintained inside the vessel by static clamping between the cover and the vessel.

6. Nuclear reactor according to claim 1, wherein the second holes comprise first connecting means for slidably connecting the lower plate to a respective one of said upper end pieces of fuel assemblies and second connecting means for connecting the corresponding cluster guide of said fuel assemblies to said lower plate.

7. Nuclear reactor according to claim 1, further comprising water coolant injection means including at least one pipe whose outlet is located in proximity of the lower part of the separating means and a medium pressure safety injection pump connected to said pipe.

8. Nuclear reactor comprising:

(a) a pressure vessel for containment of pressurized water, (b) a removable cover for said vessel, (c) water outlet nozzle means opening through said vessel in close proximity to said cover to flow said pressurized water out of said vessel and water inlet nozzle means opening through said vessel at the same horizontal level as said water outlet nozzle means, (d) a core located in said vessel and having a plurality of mutually adjacent upstanding fuel assemblies supported by a lower core plate, each of said fuel assemblies having an upper end piece arranged to laterally deflect a pressurized water flow which has been admitted into said fuel assembly through said lower core plate and has upwardly traversed said fuel assembly, (e) a plurality of clusters of control elements, each cluster being vertically downwardly movable into a respective one of said fuel assemblies and upwardly out of said respective one of said fuel assemblies by a drive shaft projecting upwardly through the cover, (f) internal equipments located in said vessel and supported by said vessel, having (fa) a cylindrical external barrel radially spaced from said vessel, cooperating with said vessel to define an annular downward water flow path from said water inlet nozzle means to a space under said lower core supporting plate, and (fb) flow separating means located above said core for collecting the water flowing out of said core and comprising:

a lower plate located immediately above said core, an upper plate located above said lower plate and at a horizontal level lower than said coolant outlet nozzle means, an envelope located within said barrel, and connecting said lower plate and upper plate, a plurality of open vertical cluster guides located within said envelope, each connecting said lower plate to said upper plate and each in alignment with a respective one of said clusters for receiving the cluster when it is withdrawn from the respective fuel assembly, a plurality of vertical spacer tubes distributed between said cluster guides each connecting a hole in said lower plate and a hole in said upper plate, whereby the water deflected by the upper end pieces of the fuel assemblies is received by said spacer tubes, is isolated by said tubes from the cluster guides and is delivered into a plenum chamber downwardly defined by said upper plate, additional means parallel to said lower plate and located at a horizontal level higher than said outlet nozzle means for defining said plenum chamber with said barrel and said upper plate, passage means formed through said barrel for communicating said plenum chamber with said outlet nozzle means, and a plurality of guiding tubes for guiding the drive shafts of said clusters, each of said guiding tubes traversing said plenum chamber, being aligned with a respective one of said cluster guides, and isolating the respective drive shaft from the water flowing through said plenum chamber from said spacer tubes to said passage means;

whereby the water flowing out of the fuel assemblies is isolated from the water surrounding the clusters and their drive shafts throughout its travel to the outlet nozzle means.

9. Nuclear reactor according to claim 8, further comprising:

a water volume defined by said cover and by a top part of the internal equipments, and vertical passage means by-passing the core, and communicating the water inlet nozzle means with the water volume, whereby a water pressure prevails in said volume which is higher than the pressure of the water exiting the core.

* * * * *